United States Patent [19]

Nakasugi et al.

[11] Patent Number: 5,097,164
[45] Date of Patent: Mar. 17, 1992

[54] HERMETICALLY SEALED TYPE DYNAMIC PRESSURE FLUID BEARING MOTOR

[75] Inventors: Mikio Nakasugi, Chofu; Yoshiaki Watanabe; Yoshihiko Hirose, both of Yokohama, all of Japan

[73] Assignee: Canon Kabushiki Kaisha, Tokyo, Japan

[21] Appl. No.: 458,549

[22] Filed: Dec. 28, 1989

[30] Foreign Application Priority Data

Dec. 29, 1988 [JP] Japan .................... 63-333412
Dec. 29, 1988 [JP] Japan .................... 63-333413
Dec. 29, 1988 [JP] Japan .................... 63-333414

[51] Int. Cl.⁵ ................................. H02K 5/10
[52] U.S. Cl. ................................ 310/88; 310/68 B; 310/89; 310/90; 310/91; 250/231.16; 277/50; 277/72 FM; 384/114
[58] Field of Search ............... 310/90, 91, 90.5, 89, 310/157, 254, 88, 156, 85, 43, 68 B; 277/50, 52, 1, 72 FM; 384/100, 113, 114; 150/231.14, 231.16; 350/6.7, 6.8; 324/173-175; 73/660, 661

[56] References Cited

U.S. PATENT DOCUMENTS

| | | | |
|---|---|---|---|
| 4,134,595 | 1/1979 | Melville | 277/1 |
| 4,359,228 | 11/1982 | Cather | 277/1 |
| 4,387,299 | 6/1983 | Akiyama | 250/231.14 |
| 4,487,514 | 12/1984 | Mori | 384/113 |
| 4,523,800 | 6/1985 | Yamashita | 310/90 |
| 4,591,168 | 5/1986 | Holzer | 277/1 |
| 4,637,264 | 1/1987 | Takahashi | 250/231.14 |
| 4,652,149 | 3/1987 | Nakaoka | 384/100 |
| 4,686,362 | 8/1987 | Merlo | 250/231.14 |
| 4,797,009 | 1/1989 | Yamazaki | 384/100 |
| 4,900,958 | 2/1990 | Kitahara | 310/90 |

FOREIGN PATENT DOCUMENTS

| | | | |
|---|---|---|---|
| 0864344 | 12/1952 | Fed. Rep. of Germany | 277/50 |
| 58-5518 | 1/1983 | Japan . | |
| 2083873 | 3/1982 | United Kingdom | 277/50 |

*Primary Examiner*—R. Skudy
*Attorney, Agent, or Firm*—Fitzpatrick, Cella, Harper & Scinto

[57] ABSTRACT

A motor supported by a dynamic pressure fluid bearing supporting a rotatable member by the dynamic pressure of fluid created by rotation is hermetically sealed with respect to the outside. The motor further includes a fixed shaft with the grooves and a rotatable sleeve. The rotatable sleeve is engageable with the fixed shaft and an optical member are mounted on the rotatable shaft.

3 Claims, 7 Drawing Sheets

HERMETICALLY SEALED TYPE DYNAMIC PRESSURE FLUID BEARING MOTOR

BACKGROUND OF THE INVENTION

1. Field of the Invention

This invention relates to a hermetically sealed type dynamic pressure fluid bearing motor in which a rotatable member such as a rotatable polygonal mirror is supported by a dynamic pressure fluid bearing provided in a hermetically sealed case, as seen in a polarization scanning motor or the like.

2. Related Background Art

In a polarization scanning motor for rotatably driving a rotatable polygonal mirror in a laser beam printer or the like, it is required that irregularity of rotation be made small even when there is a large temperature change also, high accuracy is required of a rotatable member bearing portion therefor.

On the other hand, as means for securing high bearing accuracy, use is made, for example, of a dynamic pressure fluid bearing which supports a rotatable member with the dynamic pressure of fluid generated by the rotatable member.

The prior-art materials for a motor using a dynamic pressure fluid bearing are as follows.

1) Japanese Laid-Open patent application No. 58-5518 discloses a dynamic pressure type spindle device using a dynamic pressure type cylindrical channel bearing.

2) U.S. Pat. No. 4,487,514 shows a motor having a dynamic pressure type bearing using error lubrication.

3) U.S. Pat. No. 4,652,149 shows a dynamic pressure fluid bearing according to the applicant's prior application.

SUMMARY OF THE INVENTION i) In a hermetically sealed type dynamic pressure fluid bearing motor according to the prior art, it has been possible to intercept dust or the like from the outside, but there has been the following problem.

It is known to form a through-hole in the case of the motor and force a shaft member such as a fixing shaft or a positioning pin into the through-hole and fix the shaft member. However, air leaks from the fitted portion thereof and therefore, water vapor in the outside air enters the case and the relative humidity of the air in the case rises. Thus, sometimes the water vapor condenses on the dynamic pressure fluid bearing portion or corrosion or biting occurs, thereby deteriorating the bearing characteristics as the dynamic pressure fluid bearing and making the rotation of the motor unstable.

That is, when the water vapor in the outside air enters the case through a minute gap in the press-fitting hole and the relative humidity of the air in the case reaches a predetermined level (e.g. 60%) or higher, the water vapor is changed into water by an isothermal change when pressure (e.g. one atmospheric pressure as measured in terms of gauge pressure) is created during the rotation of the motor, and thus, sometimes, the rotation has become unstable and a rotating sleeve of the motor comes into contact with the fixing shaft and the inner surface of the rotating sleeve has been shaved to cause seizure of the motor.

It is a first object of the present invention to solve such a problem peculiar to the prior art and to provide a hermetically sealed type dynamic pressure fluid bearing motor in which the entry of water vapor into a hermetically sealed motor case is prevented by an inexpensive construction and the amount of water vapor in the air within the motor case is kept at a predetermined value or lower, whereby the deterioration of the characteristics of the dynamic pressure fluid bearing and the occurrence of biting can be prevented.

ii) Where a motor case for hermetic sealing is made from plastic molding, the cost is low, but the plastic material absorbs the outside water vapor and this absorbed water vapor is discharged into the interior of the hermetically sealed motor case. In some cases, the amount of water vapor contained in the air within the motor case increases and the water vapor condenses on the dynamic pressure fluid bearing or corrosion or biting occurs thereby deteriorating the characteristics as the dynamic pressure fluid bearing and making the rotation of the motor unstable.

That is, when the relative humidity of the air in the motor unit reaches a predetermined level (e.g. 60%) or higher, the water vapor is changed into water by an isothermal change when pressure (e.g. one atmospheric pressure as measured in terms of gauge pressure) is created during the rotation of the motor, and thus, in some cases, the rotation has become unstable and the rotating sleeve comes into contact with the fixing shaft and the inner surface of the rotating sleeve has been shaved to cause seizure of the motor.

So, if the case of the hermetically sealed type dynamic pressure fluid bearing motor is made of a metal material, the above-noted problem of the entry of water vapor will be solved, but the motor will have a higher cost.

It is a second object of the present invention to solve such a problem peculiar to the prior art and to provide a hermetically sealed type dynamic pressure fluid boaring motor in which the water vapor in the air within a hermetically sealed motor case can be kept at a predetermined amount or less by an inexpensive construction and the deterioration of the characteristic of the dynamic pressure fluid bearing and the occurrence of biting can be prevented.

iii) The present invention which achieves these objectives relates to hermetically sealed type dynamic pressure fluid bearing motor having a dynamic pressure fluid bearing supporting a rotatable member by the dynamic pressure of fluid created by rotation, a case forming a hermetically sealed space for containing the dynamic pressure fluid bearing therein, and rotatable driving means for driving the rotatable member. A spot facing is provided in a communication hole formed in the case and a shaft member is tightly fitted into the communication hole, whereafter the spot facing is filled with a seal material such as epoxy resin, thereby achieving the above objects.

The depth of fit of the shaft member tightly fitted in the communication hole formed in the case is set so that the shaft member may not protrude from the outer surface of the case and a seal member made of a material of low moisture absorbing property such as polyethylene film and having an extent including the diameter of the shaft member stick on the outer surface of the fitted portion, thereby achieving the above objects.

Furthermore, the present invention achieves the above objects by providing a motor of a construction in which a drying agent is contained and held within the case.

iv) The present invention proposes a hermetically sealed type dynamic pressure fluid bearing motor in which a part or the whole of the case of the motor is formed of a plastic material having a water absorption rate of 0.06% or less and excellent in anti-water absorbing property, whereby the amount of water vapor in the air within the hermetically sealed motor is suppressed to a predetermined value or less to thereby prevent the deterioration of the characteristics as the dynamic pressure fluid bearing.

DESCRIPTION OF THE PREFERRED EMBODIMENTS i) First Embodiment

FIGS. 1 to 8 show a specific structure for achieving the aforedescribed first object.

Figure 1:
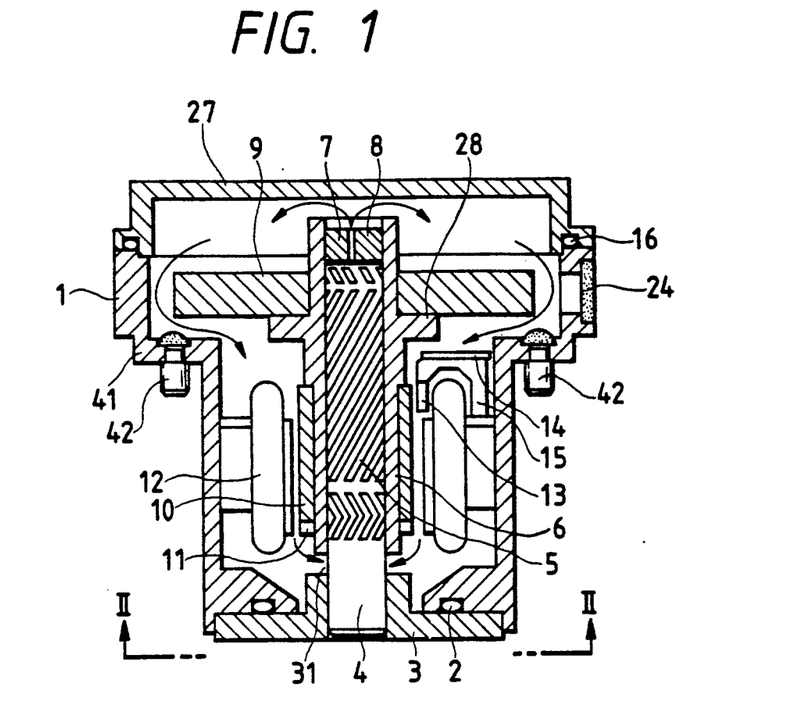
FIG. 1 is a vertical cross-sectional view of a hermetically sealed type dynamic pressure fluid bearing motor according to a first embodiment of the present invention.
Figure 2:
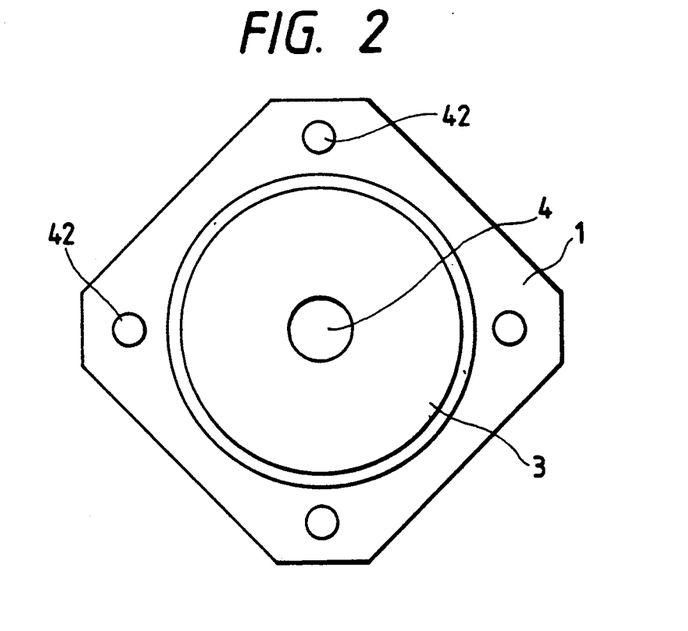
FIG. 2 is a bottom view of the FIG. 1 motor as it is seen along line II—II in FIG. 1.

FIG. 1 is a vertical cross-sectional view showing a hermetically sealed type dynamic pressure fluid bearing motor according to a first embodiment of the present invention, and FIG. 2 is a bottom view of the FIG. 1 motor as it is seen along line II—II in FIG. 1.

Referring to FIG. 1, a flange member 3 is fixed to the bottom surface of an outer cylinder 1 in a hermetically sealed state by bolts or the like through an O-ring 2, and a fixed shaft 4 extending into a motor is forced into and fixed to the central hold in the flange member 3 as by shrinkage fit.

A groove 5 comprising a herringbone groove or a spiral groove is formed in the peripheral surface of the fixed shaft 4, and a rotatable sleeve 6 is rotatably fitted around it with a gap of 2-20 $\mu$m interposed therebetween.

A thrust receiver 8 having a throttle hole 7 at the center thereof is forced into a location in the rotatable sleeve 6 which is proximate to the upper end surface of the fixed shaft 4.

On the other hand, an intake port (including a cutaway or a gap) 31 for introducing the air within a case to the outer peripheral portion of the fixed shaft 4 (the inner surface of the rotatable sleeve 6) is provided in the lower end portion of the rotatable sleeve 6.

So, a dynamic pressure fluid bearing using air or nitrogen gas as a medium is constituted by the inner surface of the rotatable sleeve 6, the outer peripheral portion of the fixed shaft 4, the thrust receiver 8 and the intake port 31.

A polygon mirror 9 is fixed to the upper side of the upper flange portion 28 of the rotatable sleeve 6 as by press-in or screw setting, a magnet 10 as the rotor of the motor is adhesively secured to the outer periphery of the rotatable sleeve 6 near the lower portion thereof, and a balance ring 11 for keeping dynamic balance is fixed to the end surface portion of the rotor magnet 10.

A stator 12 fixed to the outer cylinder 1 is disposed at a location opposed to the magnet 10, and a Hall element 13 for detecting any variation in magnetic field, a Hall IC (not shown) for obtaining a number of revolutions for PLL control from a variation in magnetic field, etc., are fixed to the stator 12 through a printed substrate 14 and a holder 15, and rotatably driving means (a DC motor) for driving a rotatable member is constituted by these.

Also, a glass window 24 through which a laser beam scanned by the polygon mirror 9 enters and exits is adhesively o otherwise attached to the outer cylinder 1 in a pealed state.

Further, a cap 27, divided to facilitate assembly and forming a part of the case, is fixed to the upper portion of the outer cylinder 1 with an O-ring 16 interposed therebetween and in a sealed state relative to the outer cylinder 1.

When operating the motor, if an electric current is caused to flow to the coil of the stator 12, the rotatable sleeve 6 begins to rotate in a predetermined direction by the magnetic repelling and attracting force with respect to the magnet 10.

As a result, by the air flow between the groove 5 of the fixed shaft 4 and the inner surface of the rotatable sleeve 6, the air within the case flows from an entrance (air intake port) 31 formed in the lower end of the rotatable sleeve 6 into the surroundings of the fixed shaft 4, and further flows in along the groove 5 formed in the fixed shaft 4, and pressure is created in the radial direction.

Also, the flow of the air is throttled by the throttle hole 7 of the upper thrust receiver 8, whereby pressure is also created in the thrust direction.

Accordingly, the rotatable sleeve 6 continues to rotate without contacting with the fixed shaft 4 both in the radial and thrust directions.

In this case, a flow of air as indicated by arrows in FIG. 1 is created within the case. The flow rate of this air flow is, e.g. 2-20 cm$^3$ per minute.

In FIGS. 1 and 2, positioning pins 42 for positioning and fixing the motor (the polarization scanning motor)

at the optical design position are forced and fitted into locations (e.g. three locations) in the marginal portion forming the intermediate bottom 41 of the outer cylinder 1 which forms a part of the case of the motor.

Figure 3:
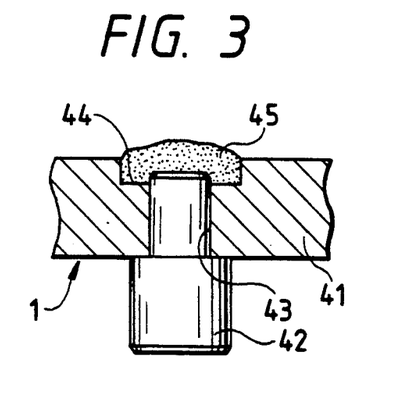
FIG. 3 is a fragmentary enlarged vertical cross-sectional view of the fitted portion of a positioning pin in FIG. 1.

FIG. 3 is a fragmentary vertical cross-sectional view showing the forced-in and fitted portion of the positioning pin 42.

Referring to FIG. 3, a communication hole 43 leading to the inside and outside of the case is formed in the intermediate bottom 41 of the outer cylinder 1, and a spot facing 44 having of predetermined depth is formed in the end surface of the communication hole 43 which is inside the case.

On the other hand, the positioning pin 42 is of a stepped shape in order that it may be readily forced in and that its pin height may be accurate.

Thus, the positioning pin 42 is forced and fitted into the communication hole 43 as shown, whereafter the spot facing 44 is filled with a seal material such as epoxy resin.

When the positioning pin 42 is simply forced and fitted into the communication hole, the air may leak through a minute gap in the fitted portion, but by filling the spot facing with the seal material 45 so that the entire periphery of the forced-in and fitted portion of the pin 42 is completely covered with the seal material as shown, the leakage of the air from the fitted portion can be eliminated and a reliable sealing property can be obtained.

Turning back to FIG. 1, the flange member 3 forming a part of the case is usually made of a metal material such as aluminum or steel, and the fixed shaft 4 constituting the dynamic pressure fluid bearing is forced and fitted into the central portion of the flange member 3.

Figure 4:
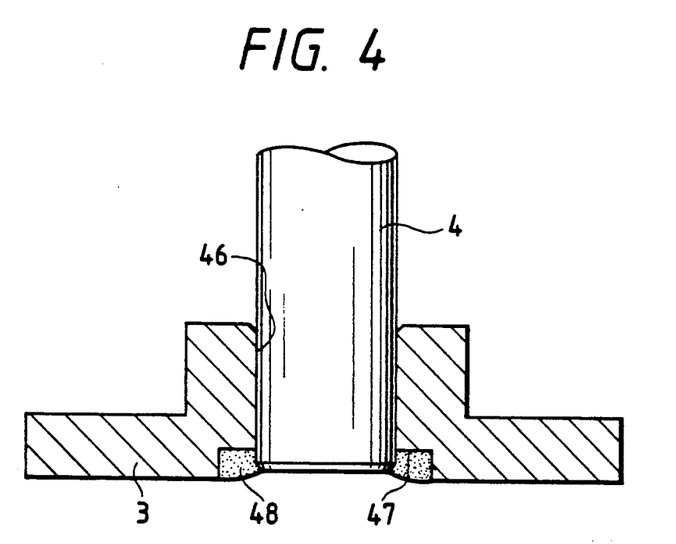
FIG. 4 is a fragmentary enlarged vertical cross-sectional view of the fitted portion of a fixing shaft in FIG. 1.

FIG. 4 is a fragmentary enlarged vertical cross-sectional view of the forced-in and fitted portion of the fixed shaft 4.

Referring to FIG. 4, a communication hole (throughhole) 46 leading to the inside and outside of the case is formed in the central portion of the flange member 3, and a spot facing 47 having a predetermined depth is formed in the end surface of the communication hole 46 which is outside the case.

Thus, the fixed shaft 4 is tightly fitted (including press-in or shrinkage fit) into the communication hole 46, as shown, whereafter the spot facing 47 is filled with a seal material 48 such as epoxy resin.

Again in this case, when the fixed shaft 4 is simply tightly fitted into the communication hole, the air may leak through a minute gap in the fitted portion, but by filling the spot facing with the seal material 48 so that the entire periphery of the fitted portion of the fixed shaft 4 is completely covered with the seal material 48 as shown, any leakage of the air from the fitted portion can be eliminated and a reliable seating property can be obtained.

The positioning pins 42 and the fixed shaft 4 are generically named "shaft members" for the communication holes 43 and 46 into which they are fitted, and the present invention is characterized in that communication holes 43 and 46 communicating with the inside and outside of the case are formed in the members constituting the case and also spot facings 44 and 47 are provided in the end surfaces of the communication holes 43 and 46 and the pin 42 and shaft 4 are tightly fitted into the communication holes 43 and 46, whereafter the spot facings 44 and 47 are filled with a seal material such as epoxy resin.

According to the above-described embodiment, the pin 42 and shaft 4 are tightly fitted into the communication holes 43 and 46, whereafter the spot facings 44 and 47 provided in the communication holes 43 and 46 are filled with the seal materials 45 and 48, respectively, and therefore, the sealing performance of the fitted portion is improved markedly, and even if 2 atmospheric pressures (gauge pressure) is applied into the case in the water, air leakage (bubbles) does not occur and the inside and outside of the case can be completely hermetically sealed.

As a result, the entry of water vapor from the fitted portions of the shaft members provided in the case can be prevented to suppress the relative humidity of the air within the case to a predetermined level or lower, whereby there can be obtained a hermetically sealed type dynamic pressure fluid bearing motor in which the deterioration of the rotating performance or the occurrence of biting due to the condensation on the dynamic pressure fluid bearing can be prevented.

Figure 5:
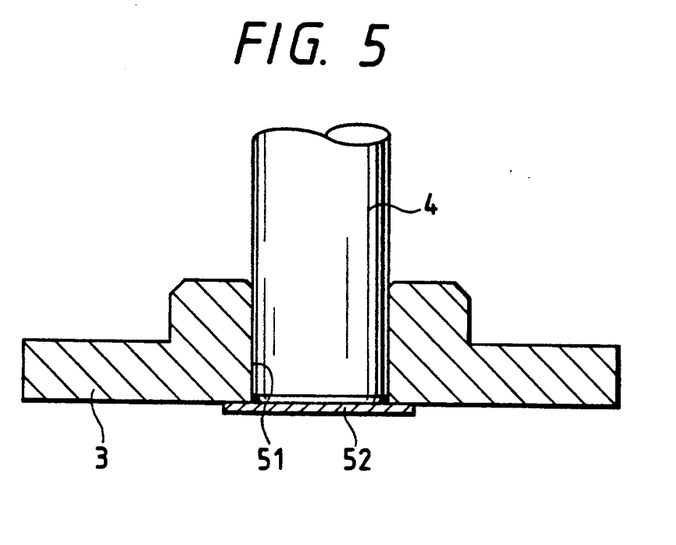
FIGS. 5 to 8 are fragmentary enlarged vertical cross-sectional view showing the other various essential portion of the hermetically sealed type dynamic pressure fluid bearing motor according to the first embodiment of the present invention.

FIG. 5 is a fragmentary enlarged vertical cross-sectional view showing the essential portions of another embodiment of the hermetically sealed type dynamic pressure fluid bearing motor according to the present invention.

In the present embodiment, a straight communication hole 51 is formed in the central portion of the flange member 3 constituting a part of the motor case and the fixed shaft (shaft member) 4 is tightly fitted in the communication hole 51 as by shrinkage fit, and the depth of fit of the fixed shaft 4 during assembly is set so that the tip end thereof does not protrude from the outer surface of the case (the flange member 3, and a seal member 52 such as polyethylene film is adhesively or tackily attached to the outer surface of the case in the fitted portion of the fixed shaft (shaft member) 4.

The seal member 52 has an extent sufficient to completely cover the entire area of the fit diameter of the fixed shaft (shaft member) 4.

Also, the seal member 52 is made of a material of small moisture absorbing property such as polyethylene film.

The embodiment of FIG. 5 differs from the embodiment of FIGS. 1 to 4 in the structure of the fitted and fixed portion of the above-described shaft member (fixed shaft) 4, and the other portions thereof are substantially the same as those of the embodiment of FIGS. 1 to 4, and corresponding portions are designated by identical reference numerals and need not be described in detail.

Again in the case of FIG. 5, when the shaft member 4 is simply tightly fitted, the air may leak through a minute gap in the fitted portion, but the above-described seal member 52 is attached to the outer surface of the case so as to completely cover the entire periphery of the fitted portion of the shaft member 4 as shown, whereby any leakage of the air from the fitted portion can be eliminated and a reliable sealing property can be obtained.

Accordingly, again by the embodiment of FIG. 5, there is obtained the same effect as that obtained by the embodiment of FIGS. 1 to 4, and the entry of water vapor from the outside air into the case can be prevented to thereby suppress the relative humidity of the air within the case to a predetermined level or lower, whereby there is obtained a hermetically sealed type dynamic pressure fluid bearing motor in which the deterioration of the rotating performance or the occurrence of biting due to the condensation or the like on the dynamic pressure fluid bearing can be eliminated.

Figure 6:
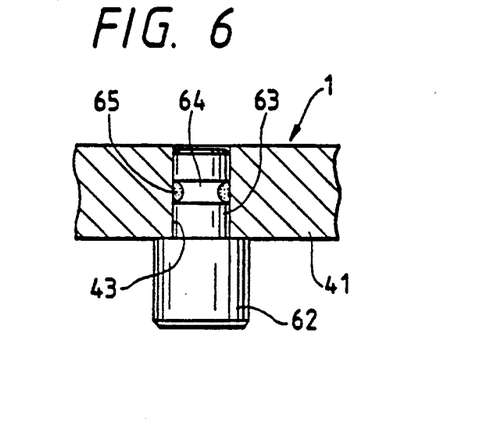

FIG. 6 is a fragmentary enlarged vertical cross-sectional view showing the essential portions of still another embodiment of the hermetically sealed type dynamic pressure fluid bearing motor according to the present invention.

In the present embodiment, a communication hole 43 leading to the inside and outside of the motor case is formed in the intermediate bottom 41 of the outer cylinder 1 forming a part of the motor case, and shaft members (positioning pins) 62 are forced into and fixed to the communication holes 43.

These positioning pins 62, like the positioning pins 42 in FIG. 1, are fixed at locations (e.g. three locations) in the marginal portion to position and fix the hermetically sealed type dynamic pressure fluid bearing motor (polarization scanning motor) at the optical design position.

The shaft members (positioning pins) 62 are of a stepped shape so that they may be readily forced in and that their height of protrusion may be highly accurate.

Thus, a circumferential groove 64 for collecting an adhesive agent is formed in the peripheral surface of the tightly fitted portion 63 of the shaft member 62, and there are adopted the steps of applying an anaerobic adhesive agent (an instantaneous adhesive agent) 65 to the surface of the tightly fitted portion 63 of the shaft member 62 and filling the groove 64 with the anaerobic adhesive agent 65, and thereafter forcing the shaft member 62 into the communication hole and fixing it thereto.

If the groove 64 is filled in advance with a sufficient amount of adhesive agent 65, the adhesive agent 65 will be retained in the circumferential groove 64 with the shaft member 62 being fitted into and assembled to the communication hole 43, and there will thus be obtained seal means having an excellent sealing property.

Again in this case, when the shaft member (positioning pin) 62 is simply forced into and fitted to the communication hole, the air may leak through a minute gap in the fitted portion, but as previously described, by forming a circumferential groove 64 in the fitted portion 63 of the shaft member 62 and also forming a seal structure in which the groove 64 is filled with the adhesive agent to thereby completely hermetically seal the entire periphery of the fitted portion, any leakage of the air from the fitted portion can be eliminated.

Accordingly, again by the embodiment of FIG. 6, an effect similar to that obtained by the embodiment of FIGS. 1-4 or FIG. 5, and the entry of water vapor from the outside air into the case can be prevented to thereby suppress the relative humidity of the air within the case to a predetermined level or lower, whereby there is obtained a hermetically sealed type dynamic pressure fluid bearing motor in which the deterioration of the rotating performance or the occurrence of biting due to the condensation or the like can be eliminated.

Figure 7:
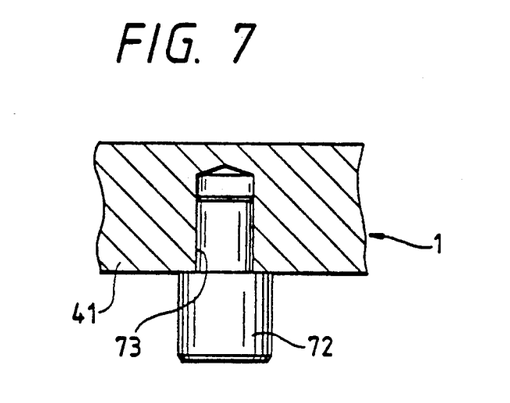

FIG. 7 is a fragmentary enlarged vertical cross-sectional view showing the essential portions of yet still another embodiment of the hermetically sealed type dynamic pressure fluid bearing motor according to the present invention.

In the present embodiment, a hole 73 for fixing a shaft member (a positioning pin) 72 formed in the intermediate bottom 41 of the outer cylinder 1 forming a part of the case of the motor is formed by a blind hole which does not extend through the case.

Again this shaft member (positioning pin) 72 is of a stepped shape so that it can be readily forced in and that its height of protrusion can be determined highly accurately.

Figure 8:
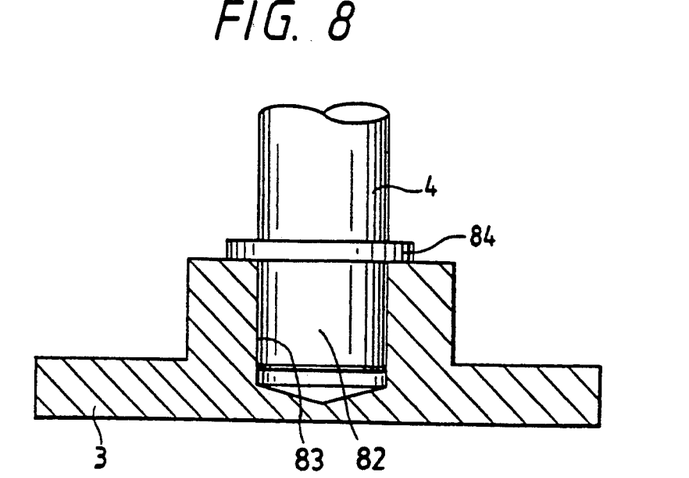

FIG. 8 is a fragmentary enlarged vertical cross-sectional view showing the essential portions of yet still another embodiment of the hermetically sealed type dynamic pressure fluid bearing motor according to the present invention.

In the present embodiment, a hole 83 for fixing a shaft member (fixed shaft) 82 formed in the central portion of a flange member 3 forming a part of the motor case is formed by a blind hole which does not extend through the flange member 3.

The shaft member (fixed shaft) 82 is formed with a flange 84 for a stopper in the intermediate portion thereof so that the height thereof during fitting can be determined highly accurately.

Both the shaft member (positioning pin) 72 in FIG. 7 and the shaft member (fixed shaft) 82 in FIG. 8 are fixed to the blind holes 73 and 83, respectively, by being tightly fitted as by force-in or shrinkage fit.

According to the embodiments of FIGS. 7 and 8, the shaft members 72 and 82 can be fixed without forming a through-hole in the case and therefore, there can be provided a hermetically sealed type dynamic pressure fluid bearing motor in which the entry of water vapor from the outside air into the case can be reliably prevented and the rise of the relative humidity of the air within the case can be eliminated to thereby eliminate the occurrence of condensation or the like and the rotating performance of the dynamic pressure fluid bearing can be maintained and biting and corrosion do not occur and which is excellent in durability and reliability.

As is apparent for the foregoing description, in a hermetically sealed type dynamic pressure fluid bearing motor having a dynamic pressure fluid bearing supporting a rotatable member by the dynamic pressure of fluid created by rotation, a case forming a hermetically sealed space for containing the dynamic pressure fluid bearing therein, and rotatably driving means for driving the rotatable member, the present invention of the provides a construction in which a spot facing is provided in a communication hole formed in the case and a shaft member is tightly fitted into the communication hole, whereafter the spot facing is filled with a seal material such as epoxy resin. The present invention also provides a construction in which the depth of fit of a shaft member tightly fitted in a communication hole formed in the case is set so that the shaft member does not protrude from the outer surface, and a seal member made of a material of small moisture absorbing property such as polyethylene film and having an extent including the diameter of the shaft member sticks to the outer surface of the fitted portion. The present invention also provides a construction in which the hole into which a shaft member is to be fitted and which is formed in the case is formed by a blind hole which does not extend through the case, thereby providing a hermetically sealed type dynamic pressure fluid bearing motor in which the entry of water vapor into the case through the fitted portion of the shaft member can be prevented to suppress the amount of water vapor in the air within the case to a predetermined value or lower, whereby the deterioration of the rotating performance of the dynamic pressure fluid bearing or the occurrence of biting or corrosion due to the condensation or the like within said case can be prevented.

ii) Second Embodiment

FIGS. 9 to 12 show an embodiment for achieving the aforementioned second object.

Figure 9:
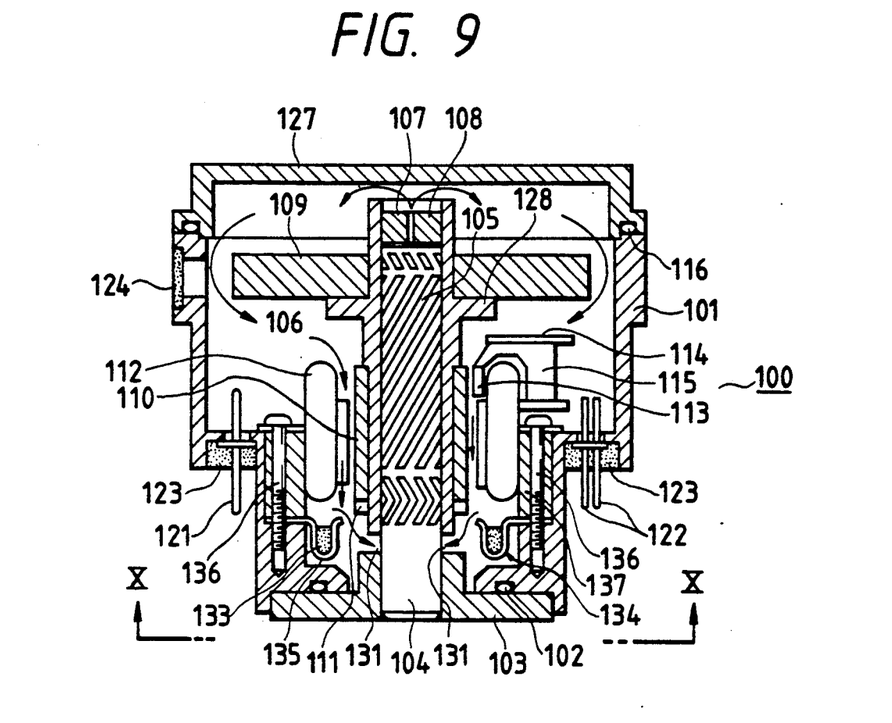
FIGS. 9 to 12 show a second embodiment of the present invention, FIG. 9 being a vertical cross-sectional view of a hermetically sealed type dynamic pressure fluid bearing motor according to the second embodiment of the present invention, FIG. 10 being a bottom view of the FIG. 9 motor as it is seen along line II—II in FIG. 9, FIG. 11 being a graph showing the water absorbing properties of various drying agents, and FIG. 12 being a graph showing the relative humidities of the air within the cases of the hermetically sealed type dynamic pressure fluid bearings according to the present invention and the prior art, respectively.
Figure 10:
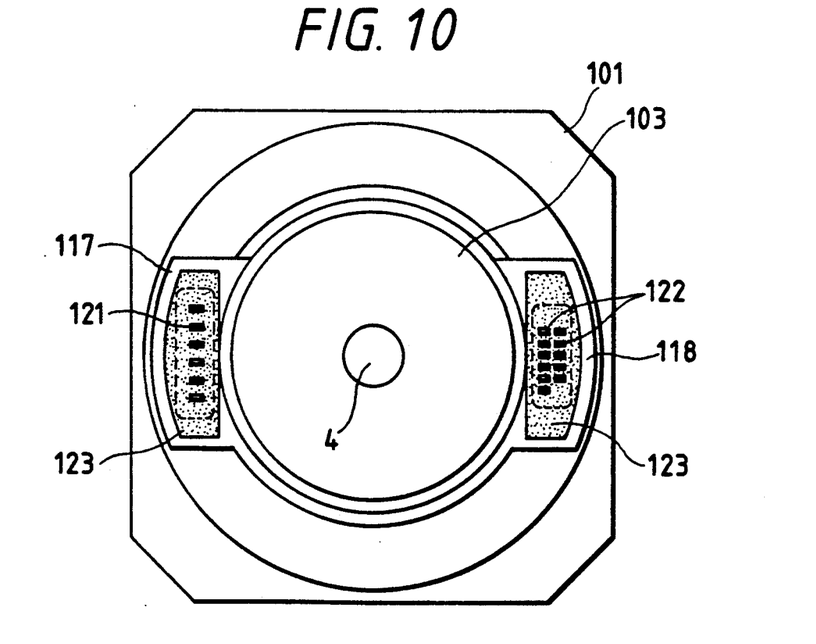

FIG. 9 is a vertical cross-sectional view showing an embodiment of a hermetically sealed type dynamic pressure fluid bearing motor 100 according to the present invention, and FIG. 10 is a bottom view of the FIG. 9 motor as it is seen along line II—II in FIG. 9.

Referring to FIG. 9, a flange member 103 is fixed to the bottom surface of an outer cylinder 101 in a hermetically sealed state by bolts or the like with an O-ring 102 interposed therebetween, and a fixed shaft 104 extending into the motor is forced into and fixed to a hole at the center of the flange member 103 as by shrinkage fit.

A groove 105 comprising a herringbone groove or a spiral groove is formed in the peripheral surface of the fixed shaft 104, and a rotatable sleeve 106 is rotatably fitted around it with a gap of 2-20 μm interposed therebetween.

A thrust receiver 108 having a throttle hole 107 in the central portion thereof is forced into a location within the rotatable sleeve 106 which is proximate to the upper end surface of the fixed shaft 104. On the other hand, in the lower end portion of the rotatable sleeve 106, there is provided an intake port (including a cut-away or a gap) 131 for introducing the air within the case to the outer peripheral portion of the fixed shaft 104 (the inner surface of the rotational sleeve 106).

So, a dynamic pressure fluid bearing using air or nitrogen gas as a medium is constituted by the inner surface of the rotatable sleeve 106, the outer peripheral portion of the fixed shaft 104, the thrust receiver 108 and the intake port 131.

A polygon mirror 109 is fixed to the upper side of the upper flange portion 128 of the rotatable sleeve 106 as by press-in or screw setting, a magnet 110 as the rotator of the motor is adhesively secured to the outer periphery of the rotatable sleeve 106 near the lower portion thereof, and a balance ring 111 for keeping dynamic balance is fixed to the end surface portion of the rotor magnet 110.

Also, a stator 112 fixed to the outer cylinder 101 is disposed at a location opposed to the magnet 110, and a Hall element 113 for detecting any variation in magnetic field, a Hall element (not shown) for obtaining the number of revolutions for PLL control from the variation in magnetic field, etc. are fixed to the stator 112 through a printed substrate 114 and a holder 115, and rotatable driving means (a DC motor) is constituted by these.

Also, a glass window 124 through which a laser beam scanned by the polygon mirror 109 enters and emerges is adhesively or otherwise secured to the outer cylinder 101 in a hermetically sealed state.

Further, a cap 127, divided to facilitate assembly and forming a part of the case, is fixed to the upper portion of the outer cylinder 101 in a hermetically sealed state relative to the outer cylinder 101 which an O-ring 116 interposed therebetween.

It is necessary that connector members 121 and 122 for connecting the electrical system of the motor to the outside be provided on the outer cylinder 101, and the connector members 121 and 122 leading to the inside and outside of the outer cylinder 101 have their inserted portions enveloped with a filler or adhesive agent 123, and the interior of the motor case is completely shielded from the outside air.

When operating the motor, if an electric current is caused to flow to the coil of the stator 112, the rotatable sleeve 106 begins to rotate in a predetermined direction by the magnetic repelling and attracting force with respect to the magnet 110.

As a result, due to the air flow between the groove 105 of the fixed shaft 104 and the inner surface of the rotatable sleeve 106, the air within the case flows from an entrance (an air intake port) 131 formed at the lower end of the rotatable sleeve 106 to the surroundings of the fixed shaft 104, and further flows in along the groove 105 formed in the fixed shaft 104, and pressure is created in the radial direction.

Also, the flow of the air is throttled by the throttle hole 107 in the upper thrust receiver 108, whereby pressure is also created in the thrust direction.

Accordingly, the rotatable sleeve 106 continues to rotate without contacting with the fixed shaft 104 both in the radial and thrust directions.

In this case, a flow of air as indicated by arrows in FIG. 9 is created within the case. The flow rate of this air flow is, e.g. of the order of 2-20 cm$^3$ per minute.

Thus, a drying agent 133 is contained and held within the case of the motor, i.e., in the embodiment of FIG. 9, within the container constituted by the outer cylinder 101, the flange member 103 and the cap 127.

In the embodiment illustrated, the drying agent 133 is held within the containing portion of a holder 134, which is fixed to the inner surface of the outer cylinder 101 by bolts 136 for fixing the stator 112 and a spacer 137.

The containing portion 135 for the drying agent 133 is disposed at a location near the intake port 131 in the lower end portion of the rotatable sleeve 106, i.e., a location at which the air flow immediately before introduced into the dynamic pressure fluid bearing contacts.

The drying agent may be silica gel, alumina gel or silica alumina gel.

The silica alumina gel has the functions of silica and alumina, and is commercially available under the tradename "Secard" having the following chemical components:

| | |
|---|---|
| $SiO_2$ | 50% |
| $Al_2O_3$ | 43.2% |
| $Fe_2O_3$ | 3.6% |
| CaO | 1.1% |
| others | 2.1% |

Also, the drying agent 133 may be in any form such as particulate form, granular form or shaped form, and can be used while being suitably packed in a bag or a container.

Further, it is preferably that the drying agent be used while being wrapped up in a dust release preventing agent comprising a substance producing no dust and having a ventilating property.

Figure 11:
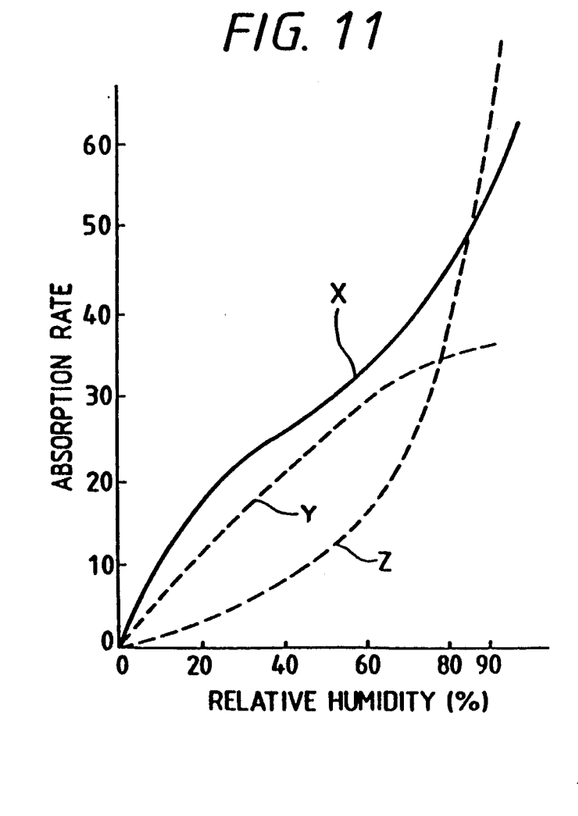

FIG. 11 is a graph showing the absorption rate (performance) to the relative humidity (abscissa) of each drying agent used as the drying agent 133.

Curve X shows the performance of the aforementioned "Secard" which is silica alumina gel, curve Y shows the performance of silica gel A type which is low in relative humidity and excellent in water absorbing power, and curve Z shows the performance of silica gel B type which is high in relative humidity and excellent in moisture absorbing power.

Figure 12:
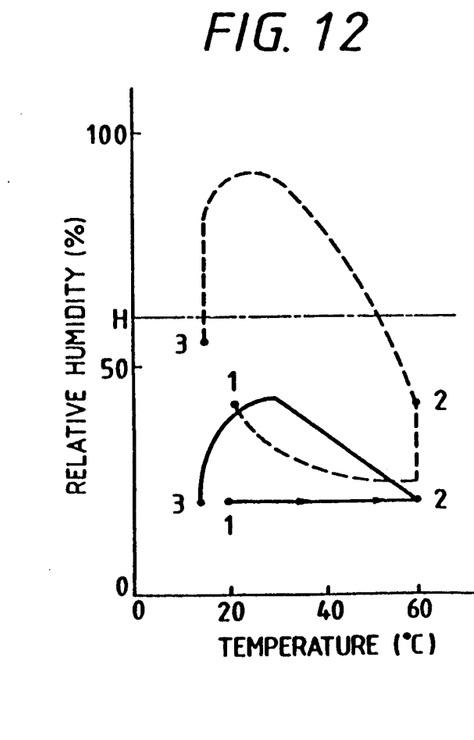

FIG. 12 is a graph showing the relative humidity to the temperature of the air within the case in the hermetically sealed type dynamic pressure fluid bearing motor of the present invention which uses the drying agent and in the hermetically sealed type dynamic pressure fluid bearing motor according to the prior art which does not use the drying agent.

In the graph of FIG. 12, ①-② shows the variation in the relative humidity for the temperature of the air within the motor case when the temperature of the outside air is 60° C. and the relative humidity thereof is 90%, and ②-③ shows the variation in the temperature and relative humidity of the air within the motor case when the temperature of the outside air is 15° C. and the relative humidity thereof is 30%.

In FIG. 12, the solid line shows the embodiment of the present invention, and the dot-and-dash line shows the relative humidity in the prior-art case.

The relative humidity H (about 60%) in FIG. 12 shows the limit relative humidity at which condensation may occur within the case or the unstability of the rotation of the dynamic pressure fluid bearing or biting may occur to cause an inconvenience in use.

As is apparent from the graph of FIG. 12, according to the hermetically sealed type dynamic pressure fluid bearing motor shown in FIG. 9, the holder 134 containing and holding the drying agent 133 therein is disposed near the air inlet 131 of the dynamic pressure fluid bearing within the hermetically sealed case and therefore, the amount of water vapor in the air within the case can be suppressed to a predetermined value or lower, and the inconvenience that condensation occurs to deteriorate the characteristic as the dynamic pressure fluid bearing or make the rotation thereof unstable or biting occurs to the bearing portion can be eliminated.

As is apparent from the foregoing description, according to the present invention, in a hermetically sealed type dynamic pressure fluid bearing motor having a dynamic pressure fluid bearing supporting a rotatable member by the dynamic pressure of fluid created by rotation, a case forming a hermetically sealed space for containing the dynamic pressure fluid bearing therein, and rotatable driving means for driving said rotatable member, a drying agent is contained and held within said case and therefore, the amount of water vapor in the air within said case can be suppressed to a predetermined value or lower, and the deterioration of the characteristic of the dynamic pressure fluid bearing or the biting thereof due to condensation or the like can be prevented.

Also, in the above-described construction, if the location for holding the drying agent is chosen near the air inlet port of the dynamic pressure fluid bearing, the above-described effect can be achieved more easily and more reliably.

iii) Third Embodiment

Figure 13:
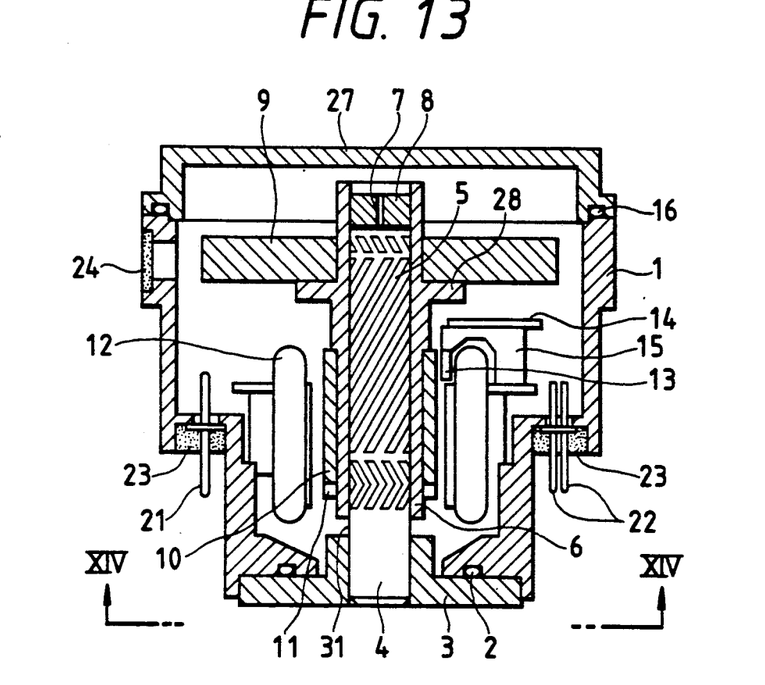
FIGS. 13 to 15 show a third embodiment of the present invention, FIG. 13 being a vertical cross-sectional view of a hermetically sealed type dynamic pressure fluid bearing motor according to the third embodiment, FIG. 14 being a bottom view of the FIG. 13 motor as it is seen along line II—II in FIG. 13, and FIG. 15 being a graph showing variations in the relative humidities within motor cases for time when the motor cases are formed of plastic small in water absorption rate and plastic not small in water absorption rate, respectively.
Figure 14:
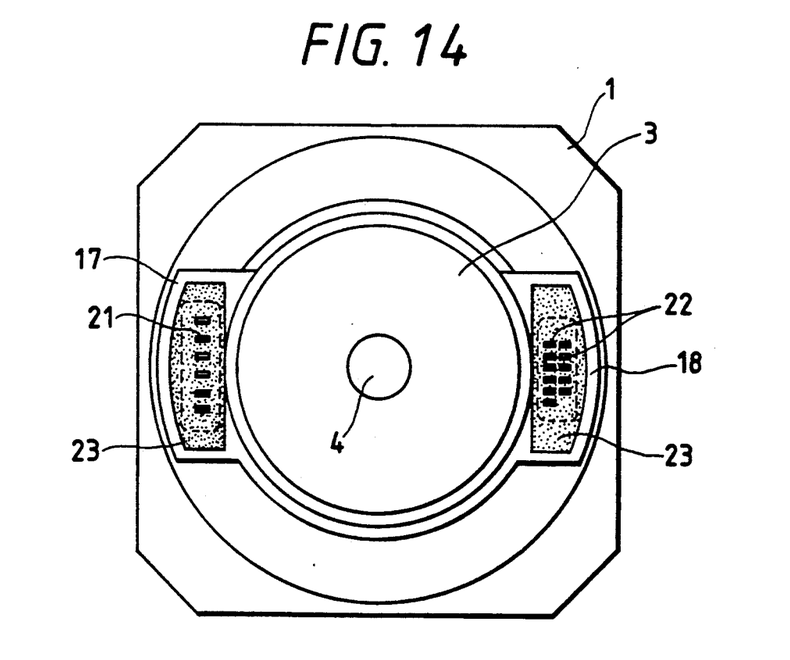
Figure 15:
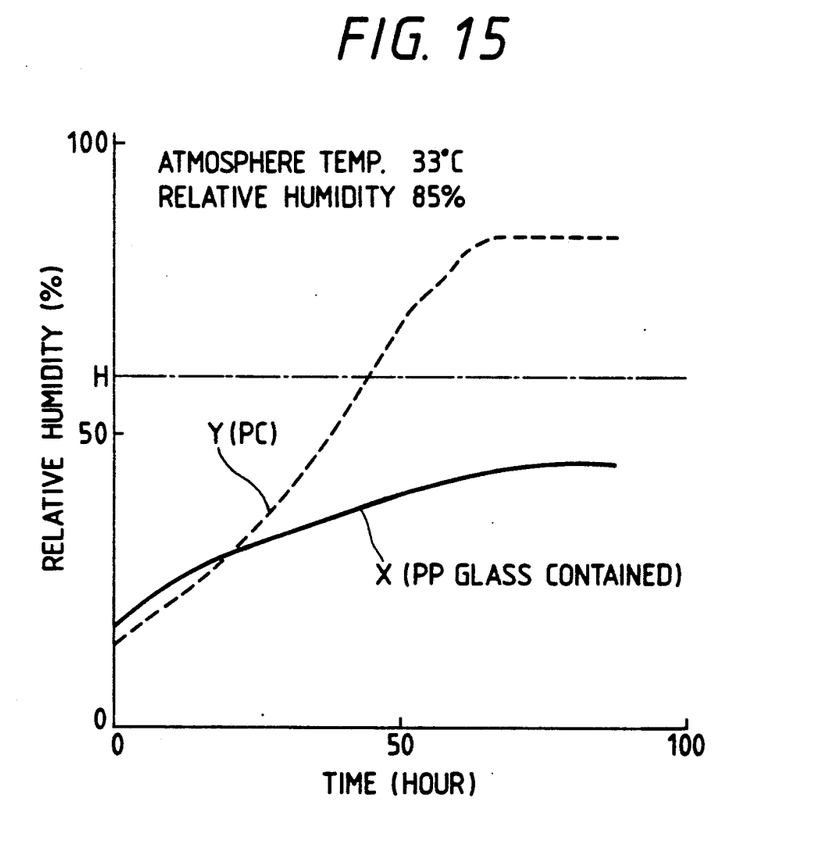

FIGS. 13 to 15 show a third embodiment of the present invention. In FIGS. 13 and 14, reference numerals identical to those in FIGS. 9 and 10 designate identical parts and constructions.

In the present embodiment, the drying agent 133, the holder 134 and the container 135 are eliminated and instead, the characteristic (the water absorption rate) of the material of the motor case is specified, whereby the amount of water vapor in the motor case may be kept at a predetermined value.

The outer cylinder 1 and cap 127 forming the container (case) of the motor are made of a plastic material having a water absorption rate of 0.06% or less (24 hours, JISK 7209).

The method of measuring the water absorption rate is prescribed in JISK 7209.

The water absorption rates (according to JISK 7209) of plastic materials are shown by way of example as follows:

| Polycarbonate | 0.15% |
| Polypropylene (glass 40%) | 0.06% |
| Polypropylene (no glass) | 0.03% |
| Polyphenylene safride | 0.02% |
| Polyethylene | 0.01% or less |

Thus, according to the present invention, as the plastic material forming a part or the whole of the motor case, use may be made of the above-mentioned plastics except polycarbonate.

FIG. 15 is a graph showing the measured values of the relative humidity within the case in a case X where the outer frame 101 of the motor of FIG. 13 and the cap 127 are formed of glass-containing propylene (having a water absorption rate 0.06%) and a case where they are formed of polycarbonate (having a water absorption rate 0.15%).

FIG. 15 shows the relative humidity within the case for the lapse of time (abscissa) in a severe condition for test wherein temperature is 33° C. and relative humidity is 85%, and H (about 60%) in FIG. 15 indicates the lower limit value of the humidity for the occurrence of biting.

As is apparent from FIG. 15, where the outer frame 101 and the cap 127 were formed of polycarbonate, the relative humidity exceeded the humidity H for the occurrence of biting, after the lapse of about 40 hours, while where the outer frame 101 and the cap 127 were formed of polypropylene, the humidity H for the occurrence of biting was reached after the lapse of two to three weeks.

According to the embodiment described above, the outer cylinder 101 and cap 127 forming the case of the hermetically sealed type dynamic pressure fluid bearing motor are made of a plastic material having a water absorption rate of 0.06% or less and difficult to absorb water vapor and therefore, even if the atmosphere temperature becomes high, the water content absorbed into the case is slight and thus, it has become possible to suppress the amount of water vapor in the air within the case to a predetermined value or less.

Accordingly, it has become possible to eliminate the inconvenience that the water vapor within the case increases and is condensed on the dynamic pressure fluid being or such bearing is corroded to thereby deteriorate the characteristic of the dynamic pressure fluid bearing and make the rotation thereof unstable.

Now, the outer cylinder 101 supports various parts of the motor and therefore, if it is formed of plastic, it will be insufficient in strength in some cases. In such cases, only the cap 127 is made of a plastic material having water absorption rate of 0.06% or less (24 hours, JISK 7209) and the outer cylinder 101 can be made of a metal material such as die castings having no water absorbing property, and a substantially similar effect can also be achieved by such structure.

It is also possible to form at least one of the outer cylinder 101 which is the container (case) of the motor and the cap 127 of a plastic material having a water absorption rate of 0.06% or less and having glass fiber, carbon fiber or the like mixed therewith, thereby improving the mechanical strength and formability thereof.

Further, by mixing glass fiber, carbon fiber or the like, it becomes possible to make all members that constitute the case of the motor, including a member such as the flange member 103 in FIG. 13 which requires mechanical strength, of a plastic material, and it becomes possible to reduce the cost and also suppress the amount of water vapor in the air within the motor case to a predetermined value or less.

Further, as another embodiment, it becomes possible to make at least one of the outer cylinder 101 which constitutes the motor case and the cap 127 of a plastic material (such as polycarbonate) having a high water absorption rate but inexpensive to mold, and stick a material having a water absorption rate of 0.06% or less to at least one of the outer peripheral surface and inner peripheral surface thereof as by coating or dipping, thereby making a case which is inexpensive and excellent in anti-water absorbing property.

Such coating method using a material of low water absorption rate can also be applied to other members such as the connector members 121 and 122 in FIG. 13 which contact with the atmosphere, and correspondingly, the amount of water vapor in the air within the case can be suppressed to a low value.

As is apparent from the foregoing description, according to the present invention, there is provided a hermetically sealed type dynamic pressure fluid bearing motor having a dynamic pressure fluid bearing supporting a rotatable member by the dynamic pressure of fluid created by rotation, a case forming a hermetically sealed space for containing said dynamic pressure fluid bearing therein, and rotatable driving means for driving the rotatable member and in which a part or the whole of said case is formed of a plastic material having a water absorption rate of 0.06% or less and therefore the amount of water vapor in the air within said case can be suppressed to a predetermined value or less and the deterioration of the characteristic as the dynamic pressure fluid bearing or the occurrence of biting can be prevented and moreover which can be manufactured at a low cost.

We claim:

1. A motor, comprising:
   a fixed shaft having a groove for generating dynamic fluid pressure;
   a rotatable sleeve engagable with said fixed shaft and having a magnet;
   an optical member mounted on said rotatable sleeve;
   a stator forming a magnetic circuit and for rotating said rotatable sleeve;
   a cylindrical member for containing said fixed shaft, said rotatable sleeve, said optical member, and said stator, said cylindrical member having a communication hole therein passing from the inside to the outside of said cylindrical member, said cylindrical member comprising a positioning member for optical positioning alignment of said optical member, inserted in the communication hole;
   a resin seal member sealing an inside opening of the communication hole; and
   a flange member having a penetrating hole therein, for supporting said fixed shaft, the penetrating hole of said flange member being sealed with said resin seal member.

2. A motor according to claim 1, wherein the penetrating hole in said flange member has a recess portion and wherein said resin seal member fills the recess portion.

3. A motor, comprising:
   a fixed shaft having a groove for generating dynamic fluid pressure;
   a rotatable sleeve engagable with said fixed shaft and having a magnet;
   an optical member mounted on said rotatable sleeve;
   a stator forming a magnetic circuit and for rotating said rotatable sleeve;
   a cylindrical member for continuing said fixed shaft, said rotatable sleeve, said optical member, and said stator, said cylindrical member having a communication hole therein passing from the inside to the outside of said cylindrical member, said cylindrical member comprising a positioning member for optical positioning alignment of said optical member, inserted in the communication hole, and wherein said motor further comprises a resin seal member sealing an inside opening of the communication hole, wherein said cylindrical member has a drying agent therein for absorbing water in the air.

* * * * *

UNITED STATES PATENT AND TRADEMARK OFFICE
CERTIFICATE OF CORRECTION

PATENT NO. : 5,097,164
DATED : March 17, 1992
INVENTOR(S) : MIKIO NAKASUGI, ET AL.

It is certified that error appears in the above-identified patent and that said Letters Patent is hereby corrected as shown below:

COLUMN 1:

Line 18, "change also," should read --change. Also,--.
Line 51, "as" should read --of--.

COLUMN 2:

Line 15, "as" should read --of--.
Line 36, "boar-" should read --bear- --.
Line 63, "stick" should read --sticks--.

COLUMN 3:

Line 26, "view" should read --views--.
Line 27, "tion" should read --tions--.
Line 67, "hold" should read --hole--.

COLUMN 4:

Line 33, "rotably" should read --rotatable--.
Line 38, "o" should read --or--.
Line 39, "pealed" should read --sealed--.

COLUMN 5:

Line 11, "having" should be deleted.
Line 55, "seating" should read --sealing--.
Line 57, "pins" should read --pin--.

UNITED STATES PATENT AND TRADEMARK OFFICE
CERTIFICATE OF CORRECTION

PATENT NO. : 5,097,164
DATED : March 17, 1992
INVENTOR(S) : MIKIO NAKASUGI, ET AL.

It is certified that error appears in the above-identified patent and that said Letters Patent is hereby corrected as shown below:

COLUMN 6:

Line 8, "is" should read --are--.
Line 33, "member 3," should read --member) 3,--.

COLUMN 8:

Line 40, "rotably" should read --rotatable--.

Signed and Sealed this

Sixth Day of July, 1993

MICHAEL K. KIRK

Attest:

Attesting Officer

Acting Commissioner of Patents and Trademarks